(12) United States Patent
Hazen et al.

(10) Patent No.: US 9,938,111 B2
(45) Date of Patent: Apr. 10, 2018

(54) METHOD AND APPARATUS FOR TRANSFER LAMINATION

(75) Inventors: Robert Hazen, Holyoke, MA (US);
Keith McCrodden, Holyoke, MA (US)

(73) Assignee: HAZEN PAPER COMPANY, Holyoke, MA (US)

( * ) Notice: Subject to any disclaimer, the term of this patent is extended or adjusted under 35 U.S.C. 154(b) by 1173 days.

(21) Appl. No.: 13/582,196

(22) PCT Filed: Mar. 2, 2011

(86) PCT No.: PCT/US2011/000387
§ 371 (c)(1),
(2), (4) Date: Nov. 7, 2012

(87) PCT Pub. No.: WO2011/109085
PCT Pub. Date: Sep. 9, 2011

(65) Prior Publication Data
US 2013/0048202 A1    Feb. 28, 2013

Related U.S. Application Data

(60) Provisional application No. 61/309,477, filed on Mar. 2, 2010.

(51) Int. Cl.
*B65H 39/16* (2006.01)
*B32B 37/00* (2006.01)
(Continued)

(52) U.S. Cl.
CPC ........... *B65H 39/16* (2013.01); *B32B 37/025* (2013.01); *B65H 41/00* (2013.01);
(Continued)

(58) Field of Classification Search
CPC ........... B32B 37/025; B32B 2037/243; B32B 2038/0092; B32B 2307/75; B32B 2457/00; B32B 37/10; B32B 37/1284; B32B 38/008; B32B 38/06; B32B 38/10; B65H 2301/5111; B65H 2301/5114; B65H 2301/51145; B65H 2301/5143; B65H 2301/5162; B65H 2701/1243;
(Continued)

(56) References Cited

U.S. PATENT DOCUMENTS 3,121,913 A * 2/1964 Hagmann et al. ............ 425/363
4,330,352 A * 5/1982 Grimes et al. ................ 156/235
(Continued)

FOREIGN PATENT DOCUMENTS

EP          1096341 A2 *  5/2001
WO    WO 2010144147 A1 * 12/2010

*Primary Examiner* — Sonya Mazumdar
(74) *Attorney, Agent, or Firm* — Grogan, Tuccillo & Vanderleeden, LLP

(57) ABSTRACT

An embodiment of the inventive method of transfer lamination involves metallizing a first side of a film and then bonding the metallized first side to a substrate. Then a coating is applied to a second side of the film after it has been bonded to the substrate. The bonded film and substrate are then placed in an oven. The film is then stripped from the substrate leaving metal from the film deposited on the substrate. The application of the coating is performed as an inline part of the transfer lamination process thereby providing an ease of manufacture presently unknown.

17 Claims, 4 Drawing Sheets

(51) Int. Cl.
*B65H 41/00* (2006.01)
*B32B 37/24* (2006.01)
*B32B 38/00* (2006.01)
*B41M 1/26* (2006.01)
*B41M 5/00* (2006.01)
*B41M 7/00* (2006.01)

(52) U.S. Cl.
CPC . *B32B 2037/243* (2013.01); *B32B 2038/0092* (2013.01); *B32B 2307/75* (2013.01); *B41M 1/26* (2013.01); *B41M 5/0041* (2013.01); *B41M 7/009* (2013.01); *B65H 2301/5111* (2013.01); *B65H 2301/5114* (2013.01); *B65H 2301/5143* (2013.01); *B65H 2301/5162* (2013.01); *B65H 2301/51145* (2013.01); *B65H 2701/1243* (2013.01); *Y10T 156/1041* (2015.01)

(58) Field of Classification Search
CPC ........ B65H 39/16; B65H 41/00; B44C 1/145; H05K 3/12; Y10T 156/1041; B41M 1/26; B41M 5/0041; B41M 7/009; B41M 7/0027
See application file for complete search history.

(56) References Cited

U.S. PATENT DOCUMENTS

| | | | |
|---|---|---|---|
| 5,112,462 A * | 5/1992 | Swisher | 205/165 |
| RE39,044 E * | 3/2006 | Ross | 427/152 |
| 2002/0134516 A1* | 9/2002 | Ashley et al. | 156/540 |
| 2004/0265549 A1* | 12/2004 | Kydd | 428/201 |
| 2006/0154050 A1* | 7/2006 | Fitch et al. | 428/336 |

* cited by examiner

STEP 1 - Coat Film Break Away

STEP 2 - Metallize Coated Film

STEP 3 - Laminate (Transfer) Film to Paper Substrate

METHOD AND APPARATUS FOR TRANSFER LAMINATION

CROSS REFERENCE TO RELATED APPLICATION

This application claims the benefit of U.S. Provisional Application Ser. No. 61/186,531, filed on Jun. 12, 2009, herein incorporated by reference in its entirety; U.S. Provisional Application Ser. No. 61/239,540, filed on Sep. 3, 2009; and U.S. Provisional Application Ser. No. 61/309,477, filed on Mar. 2, 2010, and herein incorporated by reference in its entirety.

FIELD OF THE INVENTION

The present invention relates generally to a method and apparatus for transfer lamination and more specifically to a method and apparatus in which a transfer film is coated for a subsequent use during a transfer lamination process.

BACKGROUND OF THE INVENTION

Transfer lamination is a process by which a layer of material is applied to a substrate. Generally, transfer lamination involves bonding a transfer film having a application layer, e.g., a metallized layer, to a paper substrate, stripping the film from the substrate leaving the application layer, and then applying a coating to the layer to facilitate printing. As will be appreciated, this process typically involves multiple, separate steps.

In particular, the transfer film is coated in an initial step with a breakaway layer that allows the film to be stripped from the substrate while leaving the application layer and the breakaway layer on the substrate. After the film is coated, the application layer is applied, e.g., the film is metallized. Once the film has been metallized, an adhesive is applied and the film is then bonded to the substrate and the film/substrate is cured typically in an oven. Once removed from the oven, the film is stripped away and the substrate is coated and placed again in the oven to complete the process.

A drawback to this method is that the breakaway layer is applied to the transfer film in a step separate from the transfer lamination process. As will be apparent, each manufacturing step has associated costs and it is generally desirable to reduce such costs through a simplified process with as few manufacturing steps as reasonably necessary.

Moreover, the film used in the transfer of the application layer is typically discarded, or reused only a limited number of times, after it is stripped from the substrate due to the costs of reuse/recycling.

Used transfer film also presents disposal and recycling problems as such films are generally manufactured from polyesters such as polyethylene terephthalate, ("PET"), which are not easily recycled/remanufactured. In particular, plastic films are difficult to remanufacture in that individual characteristics of potentially remanufactured products vary considerably. Likewise, the variety of extruded resins in such films pose significant recycling challenges.

These challenges are evidenced by the fact that presently only about 4.5% of all waste plastic film is recycled in the United States and plastic film makes up approximately 3.1% of all landfilled municipal solid waste. In view of the above, it is desirable to have a transfer film that can be used a large number of times.

Moreover, is also generally desirable to create two usable end products, e.g., the metallized paper substrate and the used film, during a single inline lamination process, regardless of the specific end use of the film. In particular, it is desirable for used film to have multiple potential uses including, for example, use of the film as box wrap, gift wrap and the like, in addition to reuse in a subsequent lamination process. As will be appreciated, this maximizes resources and provides significant manufacturing advantages. Such benefits are unattainable with known processes.

It is also desirable to coat a transfer film for a subsequent use in which the film is embossed or printed. This provides a great deal of flexibility in the end use of a used transfer film again maximizing resources and providing a significant environmental benefit.

As such, a need exists for a method and apparatus for transfer lamination which provides an ease of manufacture and cost savings currently unavailable with known processes. A need also exists for a transfer lamination process that does not require the disposal and/or recycling of a transfer film after a limited number of laminations. As discussed in detail herein, the present invention addresses these needs.

SUMMARY OF THE INVENTION

It is an object of the present invention to provide a method and apparatus for transfer lamination.

It is an additional object of the present invention to provide a method and apparatus for transfer lamination which provides an ease of manufacture and cost savings currently unavailable with known processes.

It is another object of the present invention to a provide method and apparatus for transfer lamination in which a transfer film need not be discarded or recycled after a single lamination.

It is an additional object of the present invention to provide a method and apparatus for transfer lamination which provides an ease of manufacture and cost savings through the inline coating of a transfer film for reuse while it is in use in a transfer lamination process.

It is another object of the present invention to provide a method and apparatus for transfer lamination in which a transfer film does not need to be discarded or recycled after a single lamination as it is coating for reuse during a transfer lamination process.

It is an object of the present invention to provide a method and apparatus for transfer lamination in which a breakaway layer may be easily applied to a transfer film.

It is yet another object of the present invention to provide a method and apparatus for transfer lamination in which a breakaway layer is easily applied to a transfer film through an inline process in which the film is bonded to a substrate prior to application of the breakaway layer.

It is an additional object of the present invention to provide a method and apparatus for transfer lamination in which a breakaway layer is applied to a transfer film through an inline process in which the film is bonded to a substrate prior to application of the breakaway layer resulting in a breakaway layer superior to that produced through known offline processes.

It is another object of the present invention to provide a method and apparatus for transfer lamination that provides a significant environmental benefit not available with known processes.

It is an additional object of the present invention to provide a method and apparatus for transfer lamination that provides a significant environmental benefit by facilitating multiple potential reuses of a used transfer film.

It is yet another object of the present invention to provide a method and apparatus for transfer lamination in which a transfer film can be coated for multiple reuses.

It is an additional object of the present invention to provide a method and apparatus for transfer lamination in which a transfer film can be coated for subsequent use as box wrap.

It is yet another object of the present invention to provide a method and apparatus for transfer lamination in which multiple coatings are applied to a transfer film inline during a transfer lamination process.

An embodiment of the inventive method of transfer lamination involves metallizing a first side of a film and then bonding the metallized first side to a substrate. Then a coating is applied to a second side of the film after it has been bonded to the substrate. The bonded film/substrate is then cured. The film is subsequently stripped away leaving metal from the film deposited on the substrate. The application of the coating is performed as an inline part of the transfer lamination process.

These and other objects, features and advantages of the present invention will become apparent in light of the detailed description of the best mode embodiment thereof, as illustrated in the accompanying drawings.

DETAILED DESCRIPTION OF THE PREFERRED EMBODIMENT

Figure 1:
FIG. 1 is a graphical illustration of a prior art transfer lamination process in which a transfer film is first coated and metallized and then used in a lamination process.
Figure 1:
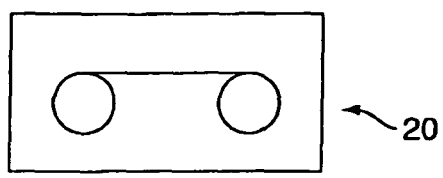
Figure 1:
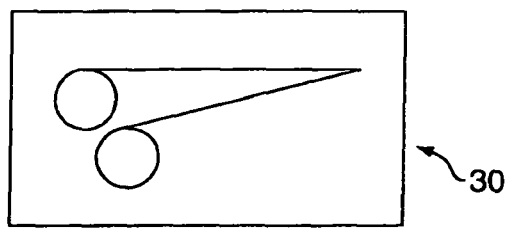

Referring to FIG. 1, known processes for transfer lamination involve three general steps. The first of these steps, labeled with reference number 10, is to coat the film used in the lamination. In particular, the film is coated with a breakaway layer that allows it to be removed or stripped from the substrate after the lamination has occurred. This step is performed offline, that is, it is not part of the main transfer lamination process that results in the end product. Moreover, only one side of the film is coated in this initial step.

After a side of the film has been coated with the breakaway layer, typically a polymer such as an acrylate or urethane, the film is metallized. The metallization step is also offline from the transfer lamination process and involves placing the coated film in a relatively large metallizer where metals are vacuum deposited on the coated film.

Once the coated film has been metallized, it is bonded to a substrate in a third step, represented by reference number 30. In this step, the coated and metallized film is placed within a transfer lamination apparatus and the film is bonded via pressurized bonding with an adhesive to the substrate. Once bonded, the film/substrate typically are cured typically in an oven. The film is then stripped away from the substrate when it emerges from the oven leaving the metal and breakaway layer on the substrate. The metallized substrate may then be coated and cured again in the oven resulting in the end product.

As stated, the above-recited steps of coating the film with a breakaway layer, metallizing the coated film and then using the metallized, coated film in a transfer lamination process, are separate from one another. As will be readily appreciated, the greater number of steps in the manufacture of a product, the higher the associated manufacturing costs and degree of manufacturing difficulty.

Figure 2:
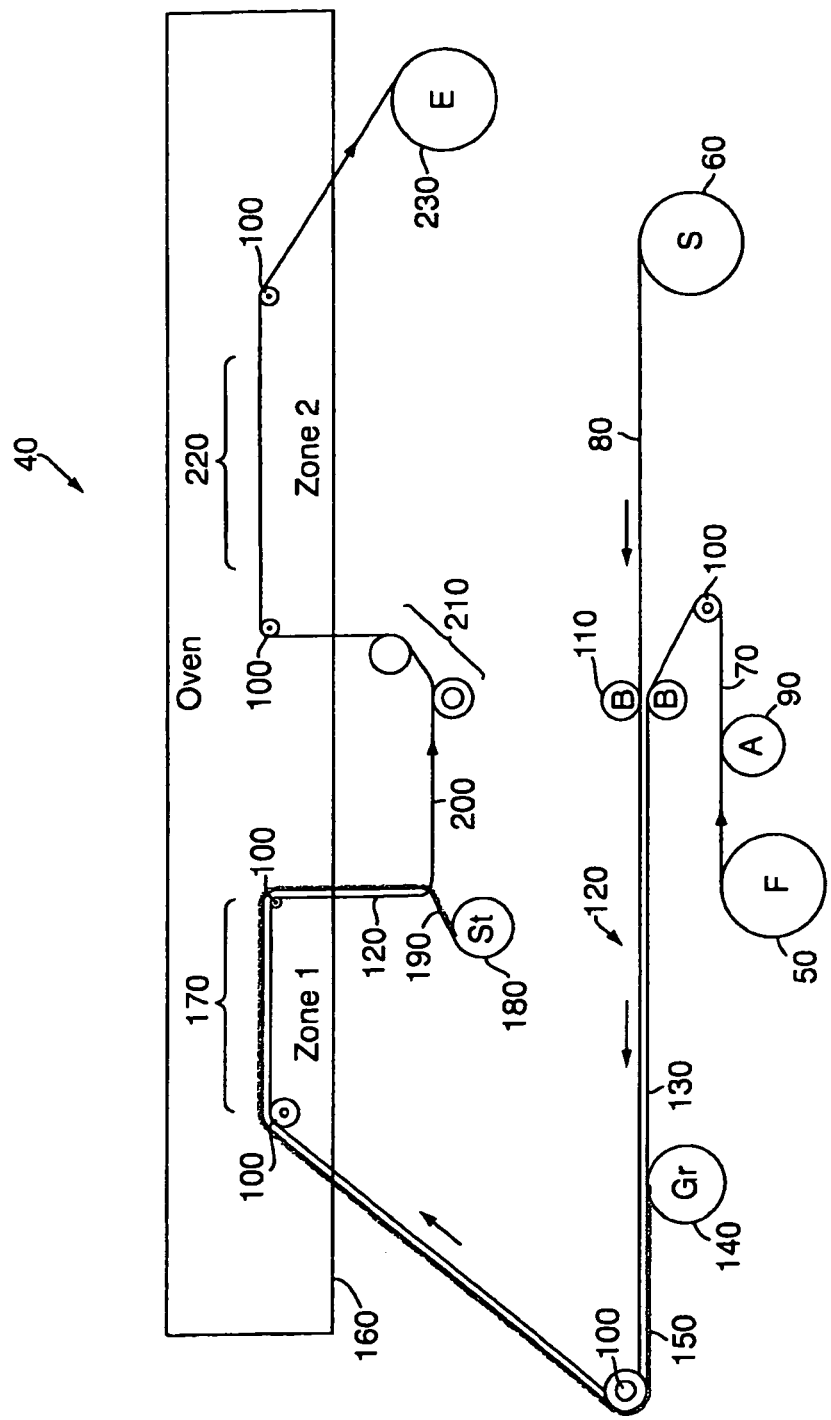
FIG. 2 is a simplified schematic diagram of an apparatus for transfer lamination in accordance with an embodiment of the present invention.

Turning now to FIG. 2, the inventive apparatus 40 combines the steps of applying the breakaway coating to a transfer film and using the coated film in a lamination process to provide an ease of manufacture and cost reduction heretofore unknown in the art. This is accomplished through the depicted apparatus 40 which includes a transfer film roll 50 and a substrate roll 60 which are unwound via motors in directions A and B respectively. The transfer film 70 is unwound from the transfer film roll 50 simultaneously with substrate 80 as it is unwound from the substrate roll 60.

The transfer film 70 has been coated with a breakaway layer on a first side which is to be bonded to the substrate 80. The film 70 has also been previously metallized in a separate process. For the present discussion, the film is described as being new, i.e., no side has been previously coated with a breakaway layer. Alternatively, however, the breakaway later present on the first side could also be the result of the inventive process, that is, the film may have been previously used and inline coated as described herein.

As the substrate 80 is unwound and travels in direction A, an adhesive/glue is applied by an applicator 90. The adhesive allows the film 70 and substrate 80 to be securely bonded. After the application of the adhesive, the film 70 encounters an idler roller 100, which changes the path of the film and guides it toward a bonding station.

In particular, the film 70 and substrate 80 are bonded through pressure bonding which is accomplished by rollers 110. Although rollers are depicted, it will be apparent that other means of bonding whether pressurized or not may be employed including the use of a pressurizing chamber instead of rollers.

Once the transfer film 70 has been bonded to the substrate 80, a first intermediate product 120 is formed. This intermediate product 120 includes the transfer film 70 with the substrate 80 bonded to the first side of the film 70. A second opposite side of the transfer film 130 remains uncoated.

As shown, this second, uncoated side 130 is then passed through a gravure coating station 140. At the gravure station 140 a roller running in a coating bath (not shown) effectively deposits a coating onto the uncoated side 130 as it passes between the coating roller and a pressure roller (not shown). The gravure coating station 140 applies a breakaway layer 150 to the uncoated side 130 eliminating the need to coat the side 130 in a separate step prior to reuse in the present lamination process.

The inline coating of the uncoated side 130 of the film 70 is an important aspect of the present invention. By providing a breakaway layer 150 to the transfer film 70 during the lamination process, a normally separate manufacturing step is avoided facilitating the convenient, cost-effective reuse of the film 70. This simplified, streamlined process provides a cost savings and ease of manufacture that is presently unknown in the art.

Moreover, it has been found that the inline coating of intermediate product 120, i.e., the film 70 bonded to the substrate 80 is superior to offline coating. In particular, it is easier to apply a breakaway layer 150 to a film 70 that is supported by a relatively rigid substrate 80 than it is to coat an unbonded flexible film. Applying a breakaway layer to the bonded intermediate product 120 results in a potentially more uniform layer as well due to this enhanced rigidity.

The simplified, cost effective manufacturing process increases the probability that the film 70 will be reused multiple times as the inline application of the breakaway layer is convenient and results in a potentially better, more uniform layer to be metallized.

While the present invention contemplates use of a gravure process, it will be appreciated that other coating methods for the inline application of the breakaway layer may be employed. Such methods may include reverse roll coating and the like as long as they can effectively apply the breakaway layer.

Moreover, the gravure coating station 140 can be used to apply other types of coatings depending upon the desired end use of the film. That is, the inventive process can be used to create films for end uses other than reuse in a subsequent lamination process.

In particular, instead of applying a breakaway layer 150, the gravure station can be configured to apply a coating having a specific color. For example, a permanent, solid white coating can be applied to the film facilitating its use for decorative purposes such as box wrap. As will be readily appreciated, coatings having colors other than white may be applied depending on the desired colorway or design.

It is also envisioned, that printable coatings can be applied to the film such that it can be used in a subsequent printing process. Indeed, the chemistry of such coatings may be varied depending on the type of printing to be carried out on the film. These print processes may include flexo or roto gravure, Indigo® and laser printing.

The ability to coat a transfer film for uses other than reuse in a subsequent lamination process is an important aspect of the present invention. As will be appreciated, this provides flexibility, maximizes resources and provides significant manufacturing advantages. A significant environmental benefit is also achieved through the inventive process and apparatus.

Returning now to FIG. 2, once past the gravure station 140, the now breakaway-coated intermediate product 120 encounters an idler roller 100, which directs the product 130 toward the oven 160. The intermediate product 130 enters a first zone 170 of the oven 160 where it is cured at a preselected temperature for a specific time period. The product 120 is then directed toward a stripping station 180 where the now pre-coated transfer film 190 is removed from the substrate leaving a substrate that includes the film's breakaway layer and metal layer bonded to its surface. This second intermediate product 200 is then directed toward a coating station 210 where it is coated to facilitate printing.

Once this coating has been applied, the second intermediate product 200 is directed toward the oven 160 where it is placed in a second zone to further cure. The result of this second curing process is the end product 230, which is collected on a roll 230.

Figure 3:
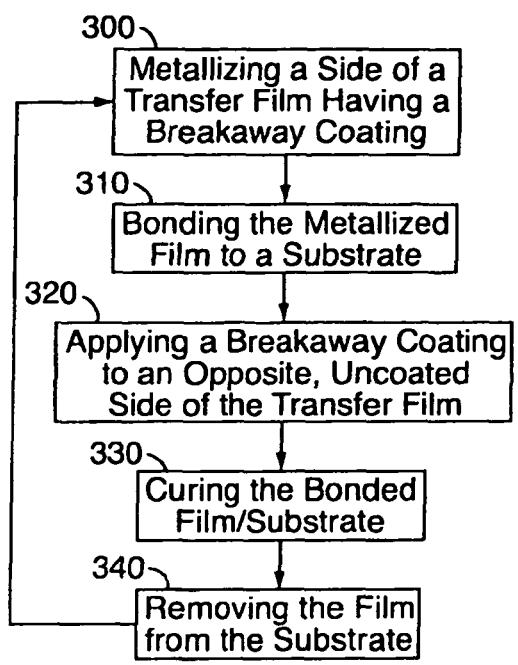
FIG. 3 is a flowchart illustrating a method for transfer lamination in accordance with an embodiment of the present invention.

Turning now to FIG. 3, the inventive process includes several key steps. The first of these steps is to metallize a first side of a transfer film, as indicated by reference number 300. As discussed above, prior to metallization, the film has been coated with a breakaway layer. In the ensuing discussion, tt is contemplated that the film to be metallized has been pre-coated with the breakaway layer as part of the inventive process. In other words, the film has been previously used and precoated in an earlier transfer lamination process. As will be appreciated, if the film is new and unused a first offline breakaway coating will be necessary.

The metallized film is then bonded to a substrate, generally paper, in a second step 310. Importantly, a breakaway layer is then applied to a second side of the transfer film at step 320 so that, as discussed above, the film may be easily and inexpensively reused.

The bonded film/substrate is then cured at step 330. This process is generally accomplished through the use of a multi-zone oven.

Once the film/substrate has been cured, the film is removed from the substrate at step 340. At this point, the substrate is coated with the breakaway layer and the metal layer. The film with its pre-coated side, can then be reused beginning with metallization step 300. Optionally, the substrate may be coated for printing in an additional, subsequent step and then cured again in the oven.

Moreover, it may also be possible to reuse the previously used side of the film. That is, one could strip the remaining material off the used side and recoat it with a breakaway layer. Alternatively, one could simply apply a breakaway layer over any residual material on the previously used side.

Figure 4:
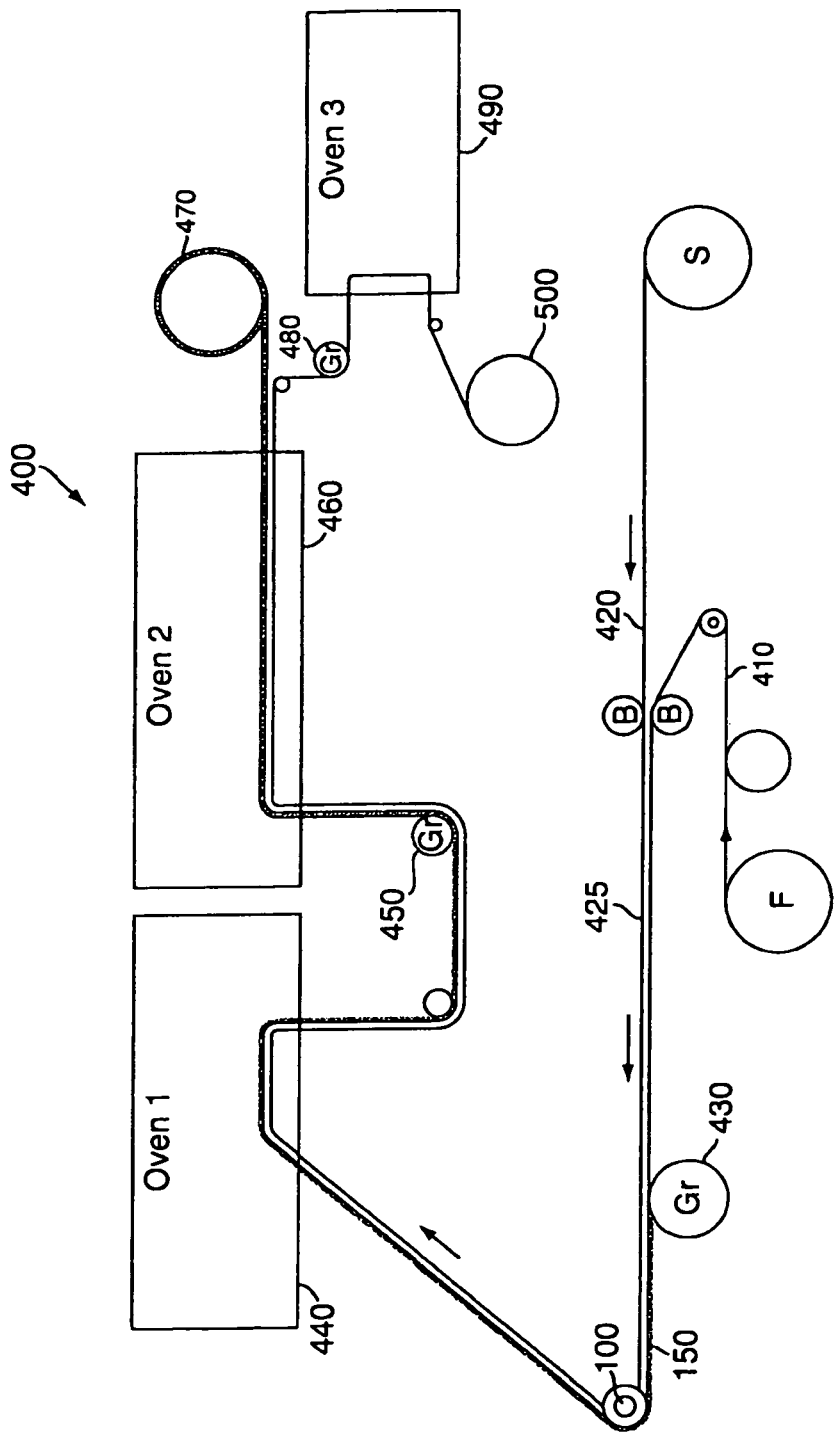
FIG. 4 is a simplified schematic diagram of an apparatus for transfer lamination in accordance with an alternative embodiment of the present invention.

Turning now to FIG. 4, an alternative embodiment of the present apparatus 400 is depicted. This embodiment, while similar to that depicted in FIG. 2, includes multiple gravure stations and ovens and facilitates the application of multiple coatings on a transfer film.

In this embodiment, the film 410 is adhered to the substrate 420 in a process much like that described above in connection with the embodiment shown in FIG. 2. The film/substrate intermediate product 425 then passes by a first gravure station 430 in which a coating is applied to the film side of the intermediate product 425. The film/substrate then passes through a first oven 440 to cure.

After emerging from the first oven 440, the film side of the intermediate product is coated again at a second gravure station 450. The film/substrate is then passed through a second oven 460.

The second oven 460 and second gravure station 450 are an important aspect of the present invention as they allow multiple coatings to be placed on the transfer film. This, in turn, allows for a wide range of potential end uses of the film. For example, the film could be coated with a breakaway coating at the first gravure station and then an embossable coating may be applied at the second gravure station 450, thereby creating an embossable transfer film which could be embossed with a holographic design prior to metallization.

Referring back to FIG. 4, after the film/substrate emerges from the second oven 460, the transfer film, now with two coatings, is stripped and would about spool 470. The metallized substrate then passes through a third gravure station 480 where it receives a coating that facilitates printing on the metallized surface and into a third oven 490 for a final cure. The metallized substrate is the wound about spool 500.

In the present example, the end products are a metallized substrate which is ready for printing and a transfer film that has two coatings on it and may be used for a variety of purposes depending on the coatings.

In addition to the above, it is also possible to provide one of the gravure stations with a printing head so that the film may be printed on during the transfer lamination process. For example, the second gravure station 450 could be equipped with a printing head so that it can print on the transfer film after it has received a color coating at the first gravure station 430. In this configuration, the second gravure station 450 can be used to print a corporate logo or other decorative design on a colored film.

Although the embodiment in FIG. 4 is depicted with three gravure stations and ovens, other configurations are possible in which more than three stations/ovens are employed depending on the desired characteristics of the end product created from the transfer film.

In sum, the present invention is a method and apparatus for transfer lamination which, through the inline coating of a transfer film, provides an ease of manufacture, flexibility and cost savings currently unavailable with known processes. The inventive method and apparatus also does not necessitate the disposal and/or recycling of a transfer film after a limited number of uses and provides an easily applied and potentially superior breakaway coating.

Although this invention has been shown and described with respect to the detailed embodiments thereof, it will be understood by those of skill in the art that various changes may be made and equivalents may be substituted for elements thereof without departing from the scope of the invention. In addition, modifications may be made to adapt a particular situation or material to the teachings of the invention without departing from the essential scope thereof.

Therefore, it is intended that the invention not be limited to the particular embodiments disclosed in the above detailed description, but that the invention will include all embodiments falling within the scope of this disclosure.

What is claimed is:

1. A method for transfer lamination, said method comprising the steps of:
   metallizing a first side of a film;
   bonding said metallized first side of said film to a substrate;
   applying a first coating to a second side of said film at a first gravure station after it has been bonded to said substrate and while it is bonded to said substrate such that said substrate imparts rigidity to said film while said first coating is applied to said second side of said film in order to achieve a uniform application of said first coating on said second side of said film;
   curing said bonded film and substrate in a first oven; and
   removing said film from said substrate leaving metal from said film deposited on said substrate thereby producing a metalized substrate;
   wherein said application of said first coating is performed as an inline part of a transfer lamination process.

2. The method of claim 1, further comprising the steps of:
   applying a second coating to said second side of said film at a second gravure station;
   curing said film and substrate in a second oven;
   applying a third coating to a first side of said metallized substrate at a third gravure station to facilitate printing on said metallized substrate; and
   curing said metallized substrate in a third oven.

3. The method of claim 2, further comprising the step of:
   winding the metallized substrate about a spool.

4. The method of claim 1, wherein:
   said first coating is a breakaway coating.

5. The method of claim 4, wherein:
   said breakaway coating is a polymer.

6. The method of claim 1, wherein:
   at least one the first, second and third gravure stations includes a printing head.

7. The method of claim 6, further comprising the step of:
   printing a design on said film.

8. The method of claim 7, wherein:
   said second gravure station includes said printing head; and
   said design is printed on said film after it has received said first coating at said first gravure station.

9. The method of claim 1, wherein
   said first coating is a color coating.

10. A method for transfer lamination, said method comprising the steps of:
    metallizing a first side of a film;
    bonding said metallized first side of said film to a substrate;
    applying a first coating to an exposed, second side of said film while said metallized first side of said film is bonded to said substrate, such that said substrate imparts rigidity to said film while said first coating is applied to said exposed, second side of said film;
    curing said bonded film and substrate; and
    removing said film with said first coating on said second side thereof from said substrate leaving metal from said first side of said film deposited on said substrate thereby producing a metalized substrate and said film coated with said first coating on said second side thereof;
    wherein said applications of said first coating is performed as an inline part of a transfer lamination process.

11. The method of claim 10, further comprising the steps of:
    applying a second coating to said second side of said film while it is bonded to said substrate; and
    curing said film and substrate;
    wherein said step of applying said first coating occurs at a first gravure station; and
    wherein said step of applying said second coating occurs at a second gravure station.

12. The method of claim 10, wherein:
    said first coating is a color coating.

13. The method of claim 10, wherein:
    said second coating is an embossable coating.

14. The method of claim 13, further comprising the step of:
    embossing said film with a holographic design.

15. A system for transfer lamination of a substrate, said system comprising:
    a bonding station for bonding a metallized first side of a film to a substrate;
    a first coating station for applying a first coating to an exposed, second side of said film after said metallized first side of said film is bonded to said substrate and while it is bonded to said substrate, said substrate imparting rigidity to said film while said first coating is applied;
    a first curing station for curing said bonded film and substrate; and
    a stripping station for removing said film from said substrate to produce a metallized substrate ready for printing and a transfer film having a coating on said second side of said film.

16. The system of claim 15, further comprising:
    a second coating station for applying a second coating to said second side of said film;
    a second curing station for curing said film and substrate;
    a third coating station for applying a third coating to a first side of said metallized substrate; and
    a third curing station for curing said metallized substrate.

17. The system of claim 15, wherein:
at least one of said first and second curing station includes a printing head for printing a design on said film.

\* \* \* \* \*